United States Patent [19]

Sakai et al.

[11] 4,106,286
[45] Aug. 15, 1978

[54] WASTE HEAT RECOVERY BOILER APPARATUS

[75] Inventors: Akira Sakai; Taiji Inui, both of Hitachi; Yasuaki Yokoi, Nagoya, all of Japan

[73] Assignee: Hitachi, Ltd., Japan

[21] Appl. No.: 726,186

[22] Filed: Sep. 24, 1976

[30] Foreign Application Priority Data

Sep. 29, 1975 [JP] Japan .................. 50-116474

[51] Int. Cl.² ............................................. F01N 3/08
[52] U.S. Cl. ................... 60/39.18 B; 60/39.5; 23/288 F
[58] Field of Search .......... 60/39.18 B, 301, 39.5; 423/213.5, 239; 23/288 F

[56] References Cited

U.S. PATENT DOCUMENTS

| 3,380,810 | 4/1968 | Hamblin | 23/288 F |
| 3,599,427 | 8/1971 | Jones | 60/301 |
| 3,948,611 | 4/1976 | Stawsky | 23/288 F |
| 3,992,876 | 11/1976 | Aguet | 60/39.18 B |

FOREIGN PATENT DOCUMENTS 804,316 2/1974 Belgium .................. 423/239
804,317 2/1974 Belgium .................. 423/239

Primary Examiner—Louis J. Casaregola
Attorney, Agent, or Firm—Craig & Antonelli

[57] ABSTRACT

A waste heat recovery boiler apparatus for generating steam by utilizing the heat of exhaust gases of a gas turbine machine, comprising a passage connected at one end thereof to the gas turbine machine, said exhaust gases passing through said passage, a fuel economizer arranged in the passage for preheating feed water, an evaporator arranged in said passage and disposed on the upstream side of said fuel economizer for vaporizing the preheated feed water, a superheater arranged in said passage and disposed on the upstream side of said evaporator for superheating the vaporized feed water to generate superheated steam, and a denitration device arranged in said passage and disposed in a zone in the passage for removing oxides of nitrogen from the exhaust gases. The exhaust gases in such zone have a temperature which is in the range between 300° and 400° C, and it is possible to minimize the concentration of oxides of nitrogen contained in the exhaust gases of the gas turbine machine without reducing the thermal efficiency of a combined cycle power plant including the gas turbine machine.

11 Claims, 6 Drawing Figures

WASTE HEAT RECOVERY BOILER APPARATUS

BACKGROUND OF THE INVENTION

1. Field of the Invention

This invention relates to a waste heat recovery boiler apparatus for generating steam by utilizing the heat of exhaust gases of gas turbine machines, and more particularly to a waste heat recovery boiler apparatus which is capable of lowering the concentration of oxides of nitrogen contained in the exhaust gases.

2. Description of the Prior Art

One type of waste heat recovery boiler apparatus of the prior art which is operatively connected to a gas turbine machine comprises a superheater, an evaporator, a fuel economizer and a stack arranged in the indicated order along a flow of exhaust gases from the gas turbine machine between its upstream end and its downstream end. Steam is generated in the superheater and introduced into a steam turbine, for example.

As is well known, a gas turbine machine generally comprises a compressor for compressing introduced air, a combustor for burning mixtures of the pressurized air and fuel, a turbine driven by combustion gas produced by the combustion of the fuel-air mixture, a generator connected to a load, and a system for injecting water or steam for lowering the concentration of oxides of nitrogen in exhaust gases.

In a combined cycle power plant constructed as aforesaid, it has hitherto been customary to lower the concentration of oxides of nitrogen contained in exhaust gases of the turbine machine by injecting water or steam into the combustor through a system for injecting water or steam, in an attempt to avoid the problem of air pollution by the noxious components of the exhaust gases released into the atmosphere from the gas turbine machine. However, this solution has a disadvantage in that the thermal efficiency of the combined cycle power plant shows a linear decrease as the ratio of the quantity of water or steam injected into the combustor to the quantity of air introduced into the combustor increases. For example, if the ratio of the quantity of water or steam injected into the combustor to the quantity of air introduced into the combustor is 1 percent, the thermal efficiency of the combined cycle power plant decreases 3 percent; if the ratio is 2 percent, the thermal efficiency decreases 6 percent. Thus an increase in the quantity of water or steam injected into the combustor which is necessary to satisfy the requirements to maintain the concentration of oxides of nitrogen in exhaust gases at a level which is considered acceptable for the population will cause a reduction in the thermal efficiency of a gas turbine machine and a combined cycle power plant. Moreover, if a system is to be established for limitations on the total volume of oxides of nitrogen released into the atmosphere and the oxides of nitrogen released into the atmosphere is to be limited to the level of less than 10 to 20 ppm, it will no longer be possible to satisfy the formulated requirements by means of injection of water or steam into the combustor.

To cope with this situation, proposals may be made to remove the oxides of nitrogen from the exhaust gas, in addition to said technique in which water or steam is injected into the combustor to decrease the amount of oxides of nitrogen in the exhaust gas. A dry catalytic reduction process which is one of the denitration processes consists in injecting ammonia into exhaust gases and causing the exhaust gases treated to pass through a reactor charged with a catalyst containing iron oxide so that oxides of nitrogen can be decomposed by reduction into nitrogen (which is innocuous) and steam. It is known that, in this denitration process, denitration efficiency depends primarily on the catalyst layer reaction temperature or the temperature of the exhaust gases passing through the catalyst layers of the denitration device. More specifically, denitration efficiency abruptly increases if the reaction temperature rises to the range between 200° and 300° C, with denitration efficiency being substantially maximized when the reaction temperature exceeds 300° C.

The temperature of exhaust gases of a gas turbine machine may vary depending on the output power of the gas turbine machine. For example, in case the output power of the gas turbine machine is approximately 60 MW, exhaust gases of the turbine machine will have a temperature of about 550° C. The heat of the exhaust gases is recovered as the stream of exhaust gases successively passes through the superheater, evaporator, and fuel economizer of a waste heat recovery boiler apparatus. Thus, when the exhaust gases are released into the atmosphere, the temperature thereof is reduced to about 200° C. Conversely, feed water to the boiler is heated and converted into steam of about 450° C. Therefore, even if the denitration device is installed at the exit end of the waste heat recovery boiler apparatus, the denitration device will function with a low degree of efficiency as is clear from the aforesaid temperature characteristic of the denitration device, because the temperature of the exhaust gases is about 200° C. This will make it impossible to reduce the quantity of oxides of nitrogen contained in the exhaust gases to a desired level. If the denitration device is installed at the entrance end of the waste gas recovery boiler apparatus, problems will be encountered with regard to the high temperature proof of the reactor with a catalyst and a lowering in the efficiency of the catalyst, because the exhaust gases have an elevated temperature of over 500° C.

SUMMARY OF THE INVENTION

This invention has as its object the provision of a novel waste heat recovery boiler apparatus comprising a denitration device arranged in a proper position in the passage of a stream of exhaust gases in the apparatus, whereby denitration can be effected with a high degree of efficiency and the concentration of oxides of nitrogen in the exhaust gases can be lowered satisfactorily.

According to the invention, there is provided a waste heat recovery boiler apparatus for generating steam by utilizing the heat of exhaust gases of a gas turbine machine, such apparatus comprising passage means communicating at one end thereof with the gas turbine, said exhaust gases passing through said passage means, preheater means arranged in the passage means for preheating feed water, evaporator means arranged in the passage means and disposed on the upstream side of the preheater means for vaporizing the preheated feed water, superheater means arranged in the passage means and disposed on the upstream side of the evaporator means for superheating the vaporized saturated steam to generate superheated steam, and means arranged in a zone in the passage means for removing oxides of nitrogen from the exhaust gases, the exhaust gases in such zone having a temperature in the range between 300° and 400° C.

DESCRIPTION OF THE PREFERRED EMBODIMENTS

Figure 1:
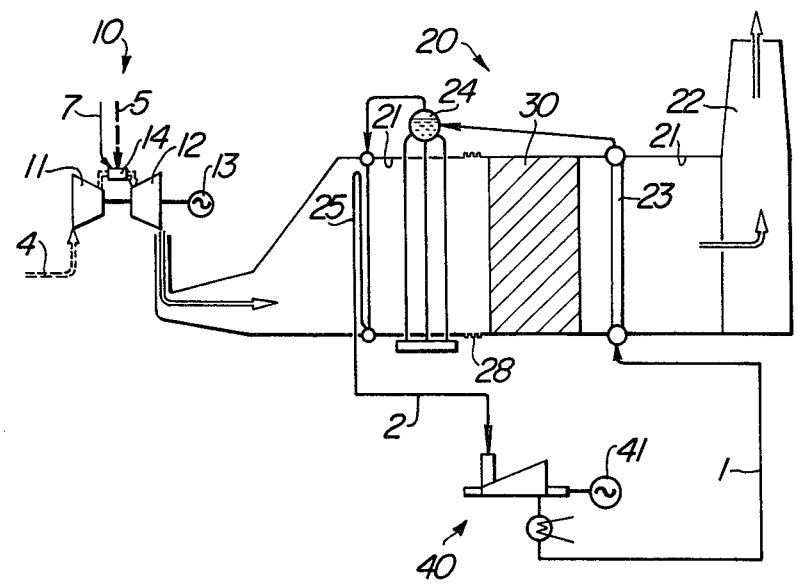
FIG. 1 is a schematic flow diagram of the waste heat recovery boiler apparatus comprising one embodiment of the present invention and operatively connected to a gas turbine machine of the output power of approximately 60 MW in a gas and steam turbine combined cycle power plant.

Referring to FIG. 1, there is shown a waste heat recovery boiler apparatus generally designated by 20 which is operatively associated with a gas turbine machine of an outer power of approximately 60 MW generally designated by 10, in a gas and steam turbine combined cycle power plant. The waste heat recovery boiler apparatus 20 generates steam by utilizing the heat of exhaust gases of the gas turbine machine 10, such steam being supplied, for example, to a steam turbine machine 40 depending on its temperature. The gas turbine machine 10 comprises a compressor 11 for pressurizing air introduced through a conduit 4, a combustor 14 for burning a mixture of the pressurized air and fuel supplied through a fuel system 5, a turbine 12 driven by combustion gas produced by the combustion of the mixture of pressurized air and fuel, and a generator 13 connected to a load.

The waste heat recovery boiler apparatus 20 comprises a passage 21 having one end thereof communicated with the gas turbine machine 10 and the other end thereof communicated with a stack 22 so that the exhaust gases from the gas turbine machine may pass through the passage 21 before being vented into the atmosphere through the stack 22. The apparatus 20 further comprises a fuel economizer 23 arranged in the passage 21 for preheating feed water, an evaporator 24 arranged in the passage 21 and disposed on the upstram side of the fuel economizer 23 for vaporizing the preheated feed water, and a superheater 25 arranged in the passage 21 and disposed on the upstream side of the evaporator 24 for superheating the vaporized saturated steam to generate superheated steam. The steam generated in the superheater 25 is introduced, for example, into the steam turbine machine 40 through a conduit 2. The steam turbine machine 40 includes a generator 41 which is connected to a load. The feed water is supplied to the fuel economizer 23 through a conduit 1.

Figure 2:
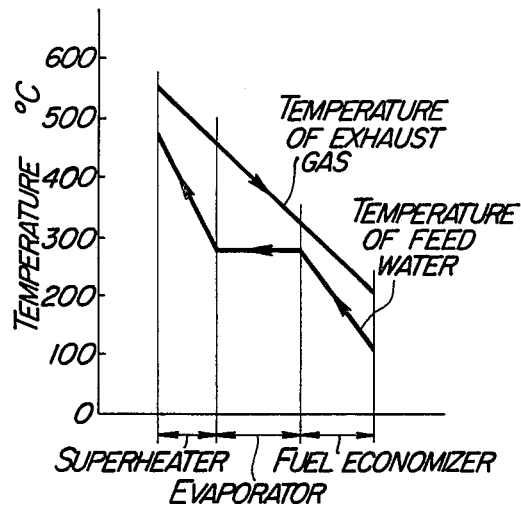
FIG. 2 is a graph showing the waste heat recovery characteristic of the waste heat recovery boiler apparatus shown in FIG. 1 as represented by the relation between the temperature of exhaust gases from the gas turbine machine and the temperature of feed water.

In the waste heat recovery boiler apparatus 20 operatively connected to the gas turbine machine of an output power of approximately 60 MW, exhaust gases of the gas turbine machine 10 initially have a temperature of about 550° C. However, as shown in FIG. 2, the heat of the exhaust gases is recovered as the gases pass through the superheater 25, evaporator 24 and fuel economizer 23 until the temperature of the exhaust gases is reduced to about 200° C when the gases are released into the atmosphere through the stack 22. Conversely, the boiler feed water is heated and changed into steam at about 450° C.

Figure 3:
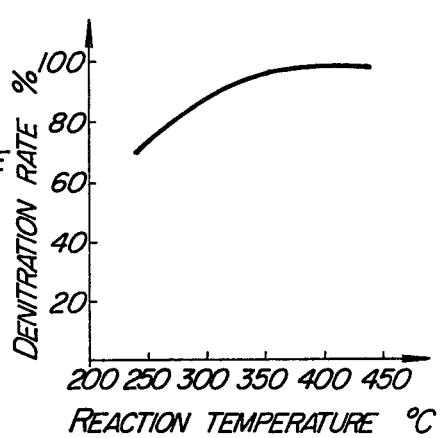
FIG. 3 is a graph showing a temperature characteristic curve indicating denitration efficiency of the denitration device relying on a dry catalyst reduction process.

On the other hand, when a denitration process is used wherein ammonia is injected into exhaust gases and the exhaust gases thus treated are caused to pass through a reactor charged with a catalyst containing iron oxide so as to decompose by reduction oxides of nitrogen into innocuous nitrogen and steam, denitration efficiency suddenly increases as the reaction temperature rises from 200° to 300° C and reaches a substantially maximum level when the reaction temperature exceeds 330° C as shown in FIG. 3. Accordingly, the reaction is preferably made in a range between 300° and 400° C in order to obtain an appropriate denitration efficiency.

As can be clearly seen in FIG. 2, the exhaust gases from the gas turbine device 10 have a temperature of about 550° C when they are introduced into the superheater 25, and the temperature of the exhaust gases is reduced to about 330° C after they have passed through the evaporator 24 disposed downstream of the superheater 25. Thus, in the embodiment shown in FIG. 1, a denitration device 30 is arranged in a zone in the passage 21 between the evaporator 24 and fuel economizer 23. An expansion joint 28 is mounted between the denitration device 30 and evaporator 24 so as to accommodate the thermal deformation of the denitration device 30 relative to the waste heat recovery boiler device 20.

The construction of the denitration device 30 will be described with reference to FIG. 4. The denitration device 30 comprises a plurality of nozzles 31 for injecting into the exhaust gases ammonia gas which is supplied through a conduit 32, and a reactor 33 in which the mixture of ammonia gas and exhaust gases undergoes reaction to decompose by reduction the oxides of nitrogen in the exhaust gases into nitrogen and steam. The reactor includes three chambers defined by partition walls 34, each of the three chambers having a catalyst layer 35 consisting of a catalyst containing iron oxide. Each chamber is divided into two compartments 36 and 36a, one compartment 36 communicating through a damper 37 with a portion of the passage 21 on the upstream side of the denitration device 30 and the other compartment 36a communicates with a portion of the passage 21 on the downstream side of the denitration device.

The waste heat recovery boiler apparatus of the combined cycle power plant provided with the denitration device 30 constructed as aforementioned operates as follows. Referring to FIGS. 1 and 4, the air introduced through the conduit 4 into the gas turbine machine is burned, after being pressurized, with fuel to produce combustion gas of elevated temperature for driving the turbine 12. Then, the exhaust gases are introduced into the waste heat recovery boiler apparatus 20. As shown in FIG. 2, the exhaust gases have a temperature of about 550° C when introduced into the superheater 25. After passing through the evaporator 24 disposed on the downstream side of the superheater 25, the temperature of the exhaust gases is lowered to about 330° C. Thus the exhaust gases have a temperature of about 330° C when introduced into the denitration device 30.

When the exhaust gases are introduced into the denitration device, ammonia gas is injected through the nozzles 31 into the exhaust gases to produce a mixture of the exhaust gases and ammonia gas. Then the mixture is caused to pass through the reactor 33. The flow rate of the mixture introduced into the reactor 33 is controlled by means of the dampers 37, so that a uniform stream of a mixture of the exhaust gases and ammonia gas is led into each compartment 36. Thus the same volume of a mixture passes through the catalyst layer 35 into the respective compartment 36a. In passing through the catalyst layers 35, the oxides of nitrogen contained in the exhaust gases are decomposed by reduction into innocuous nitrogen and steam by the action of the catalyst. Thus the exhaust gases from which oxides of nitrogen are substantially removed pass through the fuel economizer 23 disposed on the downstream side of the denitration device 30, and are released into the atmposphere through the stack 22. The waste gas recovered in this way is utilized as a heat source for converting the feed water into steam which is used to drive the steam turbine machine 40. Since the exhaust gases introduced into the denitration device 30 have a high temperature of about 330° C, the denitration device 30 is high in efficiency because it can carry out denitration at a high denitration rate of over 90% as can be clearly seen in FIG. 3.

Figure 5:
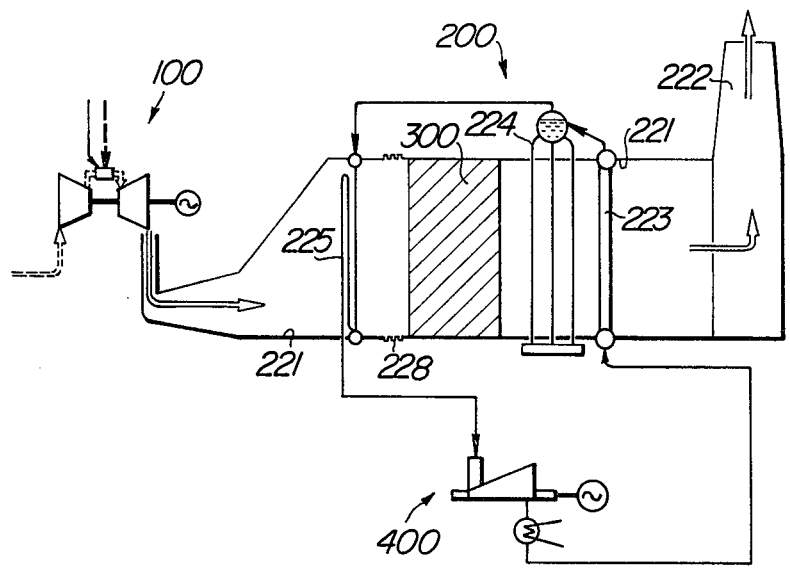
FIG. 5 is a schematic flow diagram of the heat recovery boiler apparatus comprising another embodiment of the invention and operatively connected to a gas turbine machine of an output power of approximately 10 MW in a combined cycle power plant.

FIG. 5 shows a waste heat recovery boiler apparatus 200 adapted to be operatively connected to a gas turbine machine 100 of an output power of approximately 10 MW. The waste heat recovery boiler apparatus 200 generates steam by utilizing the heat of exhaust gases from the gas turbine machine 100 which steam is introduced, for example, into a steam turbine machine 400.

When the waste heat recovery boiler apparatus 200 operatively connected to the gas turbine machine 100 of an output power of approximately 10 MW as shown in FIG. 5 is in operation, exhaust gases of the gas turbine machine 100 have a temperature of about 400° C when introduced into the superheater 225. The heat of the exhaust gases is recovered as the exhaust gases pass through the superheater 225, evaporator 224 and fuel economizer 223, so that the exhaust gases have a temperature of 200° C when released into the atmosphere through a stack 222. Conversely, the boiler feed water is heated by the recovered heat and changed into steam of about 350° C.

Figure 6:
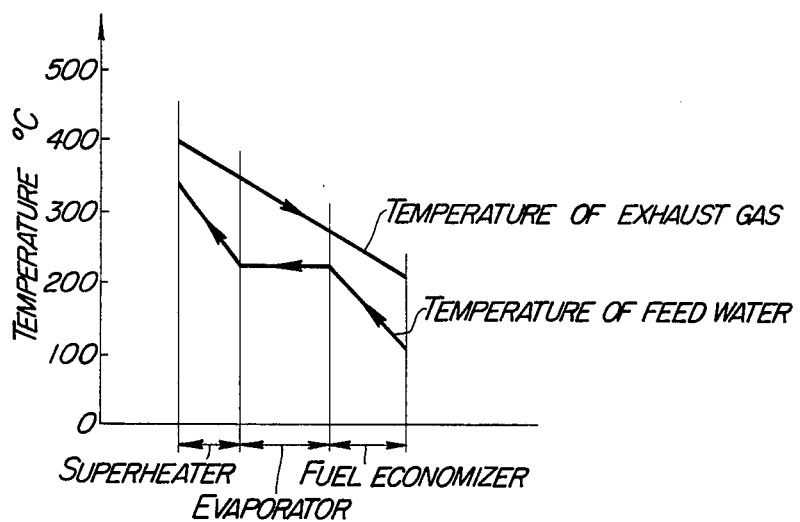
FIG. 6 is a graph showing the waste heat recovery characteristic of the waste heat recovery boiler apparatus shown in FIG. 5 as represented by the relation between the temperature of exhaust gases of the gas turbine machine and the temperature of feed water.

As can be clearly seen in FIG. 6, the exhaust gases from the gas turbine machine 100 which have a temperature of about 400° C when introduced into the superheater 225 have a temperature of about 350° C after passing through the superheater 225. Thus, in the embodiment of the invention shown in FIG. 5, a denitration device 300 is arranged in a zone in a passage 221 which is interposed between the superheater 225 and the evaporator 224. An expansion joint 228 is mounted between the denitration device 300 and the superheater 225 so as to accommodate thermal deformation of the denitration device 300 relative to the waste heat recovery boiler apparatus 200.

Figure 4:
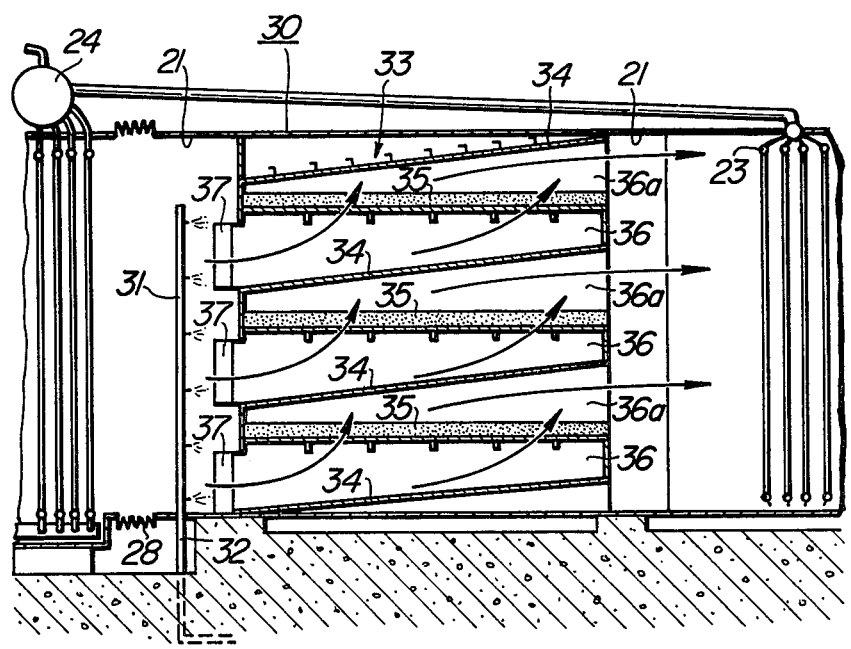
FIG. 4 is a schematic sectional view showing the construction of the denitration device.

The internal structure of the denitration device 300 is identical to that of the denitration device 30 shown in FIG. 4.

The waste heat recovery boiler apparatus of the combined cycle power plant porivded with the denitration device 300 operates substantially in the same manner as described with reference to the waste heat recovery boiler apparatus shown in FIGS. 1 and 4, so that the description of operation shall be omitted.

Since the exhaust gases introduced into the denitration device 300 have a high temperature of about 350° C, the denitration device 300 is high in efficiency because it can carry out denitration at a high denitration rate of over 90%, as shown in FIG. 3.

From the foregoing description, it will be appreciated that the present invention enables oxides of nitrogen to be removed efficiently from exhaust gases of a gas turbine machine at a high denitration rate of over 90%. Therefore, with the same level being set as the standard for all gas turbine machines with regard to the concentration of oxides of nitrogen in exhaust gases, it will be possible to obtain a compact size in a denitration device and hence it will be possible to obtain an overall compact size in a waste heat recovery boiler apparatus. Also, since it is possible to reduce the quantity of water or steam which is required to be injected into the combustor of the gas turbine machine for lowering the concentration of oxides of nitrogen in exhaust gases, thermal efficiency of the gas turbine machine and the combined cycle power plant can be increased.

The present invention offers an advantage in that full realization is achieved of advantages from the use of a waste heat recovery boiler apparatus provided with a denitration device which can achieve a high denitration efficiency in removing oxides of nitrogen from exhaust gases from a gas turbine machine. An additional advantage is that, by merely changing the arrangement of ducts of the waste heat recovery boiler apparatus, it is possible to obtain a waste heat recovery boiler apparatus having a denitration device of high efficiency installed in the apparatus.

In the embodiments shown and described hereinabove, the steam generated in the superheater has been described as being used for driving a stream turbine. It is to be understood, however, that when the gas turbine machine has a low output power and consequently the steam generated by the superheater is not high enough in temperature to drive a steam turbine, the steam may be used for space heating or other purposes.

What we claim is:

1. A waste heat recovery boiler apparatus for generating steam by utilizing the heat of exhaust gases of a gas turbine machine, comprising:
    passage means connected at one end thereof to the gas turbine machine, said exhaust gases passing through said passage means;
    means, arranged in said passage means, for preheating feed water;
    evaporator means, arranged in said passage means and disposed on the upstream side of said preheater means, for vaporizing the preheated feed water;
    means, arranged in said passage means and disposed on the upstream side of said evaporator means, for super heating the vaporized saturated steam to generate super heated steam;
    means, arranged in a zone in said passage means and adjacent to said evaporator means, for removing oxides of nitrogen from the exhaust gases, said exhaust gases in said zone having a temperature in the range between 300° and 400° C;
    means, arranged in said nitrogen oxide-removing means, for injecting ammonia gas into the exhaust gases; and catalytic reaction means, arranged in said nitrogen oxide-removing means and disposed on the downstream side of said injection means, for reaction with a mixture of said ammonia gas and said exhaust gases to thereby decompose by reduction the oxides of nitrogen in the exhaust gases into nitrogen and steam, wherein said catalytic reaction means further comprises a plurality of chambers, arranged in said catalytic reaction means, each of said chambers havng therin a catalyst layer and being divided into two compartments, one of said two compartments communicating with a portion of said passage means disposed on the upstream side of said nitrogen oxide-removing means and the other of said two compartments communicating with a portion of said passage means disposed on the downstream side of said nitrogen oxide-removing means.

2. An apparatus as claimed in claim 1, wherein said zone is interposed between said evaporator means and said preheater means.

3. An apparatus as claimed in claim 2, further comprising damper means, arranged on the downstream side of said means for injecting ammonia gas and on the upstream side of said catalytic reaction means, for controlling the flow rate of the mixture of the ammonia gas and the exhaust gases introduced into said catalytic reaction means.

4. An apparatus as claimed in claim 2, further comprising means integrally connected in said passage means for allowing joint expansion between said nitrogen oxide-removing means and said evaporator means.

5. An apparatus as claimed in claim 1, wherein said zone is interposed between said superheater means and said evaporator means.

6. An apparatus as claimed in claim 5, further comprising damper means, arranged on the downstream side of said means for injecting ammonia gas and on the upstream side of said catalytic reaction means, for controlling the flow rate of the mixture of the ammonia gas and the exhaust gases introduced into said catalytic reaction means.

7. An apparatus as claimed in claim 5, further comprising means integrally connected in said passage means for allowing joint expansion between said nitrogen oxide-removing means and said superheater means.

8. An apparatus as claimed in claim 1, further comprising a steam turbine machine into which the steam generated by said superheater means is adapted to be introduced.

9. An apparatus as claimed in claim 1, further comprising means integrally connected in said passage means for allowing joint expansion between said nitrogen oxide-removing means and said evaporator means.

10. An apparatus as claimed in claim 1, further comprising means integrally connected in said passage means for allowing joint expansion between said nitrogen oxide-removing means and said superheater means.

11. An apparatus as claimed in claim 1, further comprising damper means, arranged on the downstream side of said means for injecting ammonia gas and on the upstream side of said catalytic reaction means, for controlling the flow rate of the mixture of the ammonia gas and the exhaust gases introduced into said catalytic reaction means.

* * * * *